(12) United States Patent
Bolthouse et al.

(10) Patent No.: US 11,273,819 B2
(45) Date of Patent: Mar. 15, 2022

(54) SYSTEMS AND METHODS FOR CONTROLLING STOP/START EVENTS FOR A HYBRID ELECTRIC VEHICLE

(71) Applicant: Ford Global Technologies, LLC, Dearborn, MI (US)

(72) Inventors: Alec Bolthouse, Dearborn, MI (US); Minku Lee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 16/381,793

(22) Filed: Apr. 11, 2019

(65) Prior Publication Data
US 2020/0324756 A1 Oct. 15, 2020

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01); *B60W 20/10* (2013.01); *F02D 41/042* (2013.01); *F02D 41/065* (2013.01); *B60W 2510/0657* (2013.01); *B60W 2510/0666* (2013.01);
(Continued)

(58) Field of Classification Search
CPC ...... B60W 20/13; B60W 10/06; B60W 10/08; B60W 20/10; B60W 2050/0075; B60W 20/20; B60W 10/26; B60W 20/40; B60W 30/18018; B60W 2710/0666; B60W 2710/0677; B60W 2510/0657; B60W 2510/0666; B60W 2510/244; B60W 2540/12; B60W 2710/06; B60W 2710/083; B60W 2710/086; B60W 50/06; B60Y 2200/92; B60Y 2300/192; Y02A 50/20; Y02T 10/62; F02D 29/02; F02D 41/042; F02D 41/065; F02D 2200/1002; F02D 2200/503; F02D 2200/602; B60K 2006/268; B60K 2006/4825; B60K 6/26; B60K 6/48; F01N 2560/025; F01N 2590/11; F01N 3/10
See application file for complete search history.

(56) References Cited

U.S. PATENT DOCUMENTS 8,290,691 B2 10/2012 Lin et al.
9,789,866 B2 10/2017 Park et al.
(Continued)

*Primary Examiner* — Richard M Camby
(74) *Attorney, Agent, or Firm* — David Kelley; McCoy Russell LLP

(57) ABSTRACT

Methods and systems are provided for controlling engine operation in a hybrid electric vehicle equipped with stop/start capabilities under conditions where requested power or torque is in a hysteresis region between an engine pull up threshold and an engine pull down threshold. In one example, a method comprises obtaining an adjusted engine pull down threshold upon the requested power or torque remaining in the hysteresis region for more than a threshold duration, and commanding the engine deactivated in response to the adjusted engine pull down threshold being equivalent to the requested power or torque. In this way, a motor/generator may be used to meet the requested torque response rather than the engine under such conditions, which may improve fuel economy.

20 Claims, 7 Drawing Sheets

(51) Int. Cl.
  *B60W 10/08* (2006.01)
  *F02D 41/06* (2006.01)
  *F02D 41/04* (2006.01)
  *B60W 20/10* (2016.01)

(52) U.S. Cl.
  CPC ... *B60W 2510/244* (2013.01); *B60W 2540/12* (2013.01); *B60W 2710/06* (2013.01); *B60W 2710/083* (2013.01); *B60W 2710/086* (2013.01); *B60Y 2200/92* (2013.01); *B60Y 2300/192* (2013.01); *F02D 2200/1002* (2013.01); *F02D 2200/503* (2013.01); *F02D 2200/602* (2013.01)

(56) References Cited

U.S. PATENT DOCUMENTS

| | | | |
|---|---|---|---|
| 2006/0086341 A1* | 4/2006 | Gonzales | F02D 41/062 123/491 |
| 2006/0217228 A1* | 9/2006 | Devita | B60L 58/15 477/3 |
| 2011/0166732 A1* | 7/2011 | Yu | B60W 10/26 701/22 |
| 2011/0288712 A1* | 11/2011 | Wang | B60W 10/08 701/22 |
| 2013/0166118 A1 | 6/2013 | Kim | |
| 2015/0105949 A1* | 4/2015 | Wright | B60W 30/18009 701/22 |

\* cited by examiner

SYSTEMS AND METHODS FOR CONTROLLING STOP/START EVENTS FOR A HYBRID ELECTRIC VEHICLE

FIELD

The present description relates generally to methods and systems for improving fuel efficiency by adjusting start/stop thresholds for a hybrid electric vehicle.

BACKGROUND/SUMMARY

Hybrid electric vehicles may be equipped with a stop/start function by which an internal combustion engine is automatically switched off under certain conditions. For example, the engine may be switched off when it is idling and the vehicle is stationary or has a low speed. Specifically, the engine may be switched off when driver demand for power or torque falls below an engine pull down (EPD) threshold. The engine may then be automatically restarted responsive to a driver demand that exceeds an engine pull up (EPU) threshold. The stop/start function thus enables fuel savings because the operating time of the engine is reduced.

A difference between the EPU threshold and the EPD threshold provides a hysteresis so that if the driver requested power fluctuates, the engine is not cycled on and off repeatedly. However, the hysteresis in the EPU threshold and the EPD threshold may pose a problem if requested power is steady within the boundaries of the EPU threshold and the EPD threshold. For example, in a situation where driver requested power or torque falls below the EPU threshold but not below the EPD threshold and the request remains steady in the hysteresis region, the engine may remain on even though the request may be efficiently met via electrical power alone. In such a case, maintaining the engine on may comprise an inefficient use of fuel.

A related issue pertains to when a high voltage battery is near full charge and deceleration of the vehicle is requested. In such a situation the battery may be unable to accept further charge that would be present if regenerative braking were utilized to decelerate the vehicle, thus it may be desirable to start the engine without fueling so that engine pumping work can be used to decelerate the vehicle. Such action may be accomplished through another set of thresholds based on charge limits of the battery. However, the thresholds related to battery charge limits in combination with the EPU threshold and EPD threshold may similarly allow for a potential situation where the engine may be maintained on if steady power or torque is being requested, even though it may be more desirable to shut down the engine in order to discharge the battery.

Towards this end, U.S. Pat. No. 9,789,866 discloses raising both an engine-off reference line and an engine-on reference line responsive to the engine being operated above the engine-on reference line for a first predetermined time duration. Responsive to requested power falling below the raised engine-off reference line for a second predetermined duration, the reference lines may be reset. In this way, in response to certain deceleration events the engine may be shut off sooner than it otherwise would be. However, the inventors have herein recognized potential issues with such a method. Specifically, by raising both the engine-on reference line and the engine-off reference line, an adjusted hysteresis region is created. Accordingly, there remains a possibility that if the engine is turned off based on the raised engine-off reference line but the requested power does not remain below the raised engine-off reference line for the second predetermined duration and instead operates in the adjusted hysteresis region, the vehicle may be operated via electrical energy when it is instead more efficient to use engine operation. In other words, by raising both the engine-on reference line and the engine-off reference line, a situation may exist where the engine is shut down and then quickly rises above the raised engine-off reference line, where electric energy may be continued to be relied upon even though according to the non-adjusted engine-on reference line, operating in such a region may be more efficient via the engine. Furthermore, the disclosure by U.S. Pat. No. 9,789,866 does not address a situation where the engine is pulled up without fueling to assist in decelerating the vehicle when the battery is unable to accept further charge.

Thus, the inventors have herein recognized the above-mentioned issues and have developed systems and methods to at least partially address them. In one example, a method comprises with an engine combusting air and fuel and a driver demand between an engine pull up threshold and an engine pull down threshold, raising the engine pull down threshold to obtain an adjusted engine pull down threshold, and discontinuing engine operation in response to the adjusted engine pull down threshold reaching the driver demand while the driver demand remains below the engine pull up threshold. In this way, a motor/generator may be used under conditions where the driver demand is such that the predefined engine pull down threshold is preventing engine shutdown although meeting the driver demand with the motor/generator may be more efficient from a fuel economy perspective.

In one example, raising the engine pull down threshold to obtain the adjusted engine pull down threshold is in response to the driver demand being between the engine pull up threshold and the engine pull down threshold for greater than a predetermined duration. Furthermore, raising the engine pull down threshold to obtain the adjusted engine pull down threshold may further comprise raising the engine pull down threshold at a predetermined rate, the predetermined rate adjustable as a function of the driver demand.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
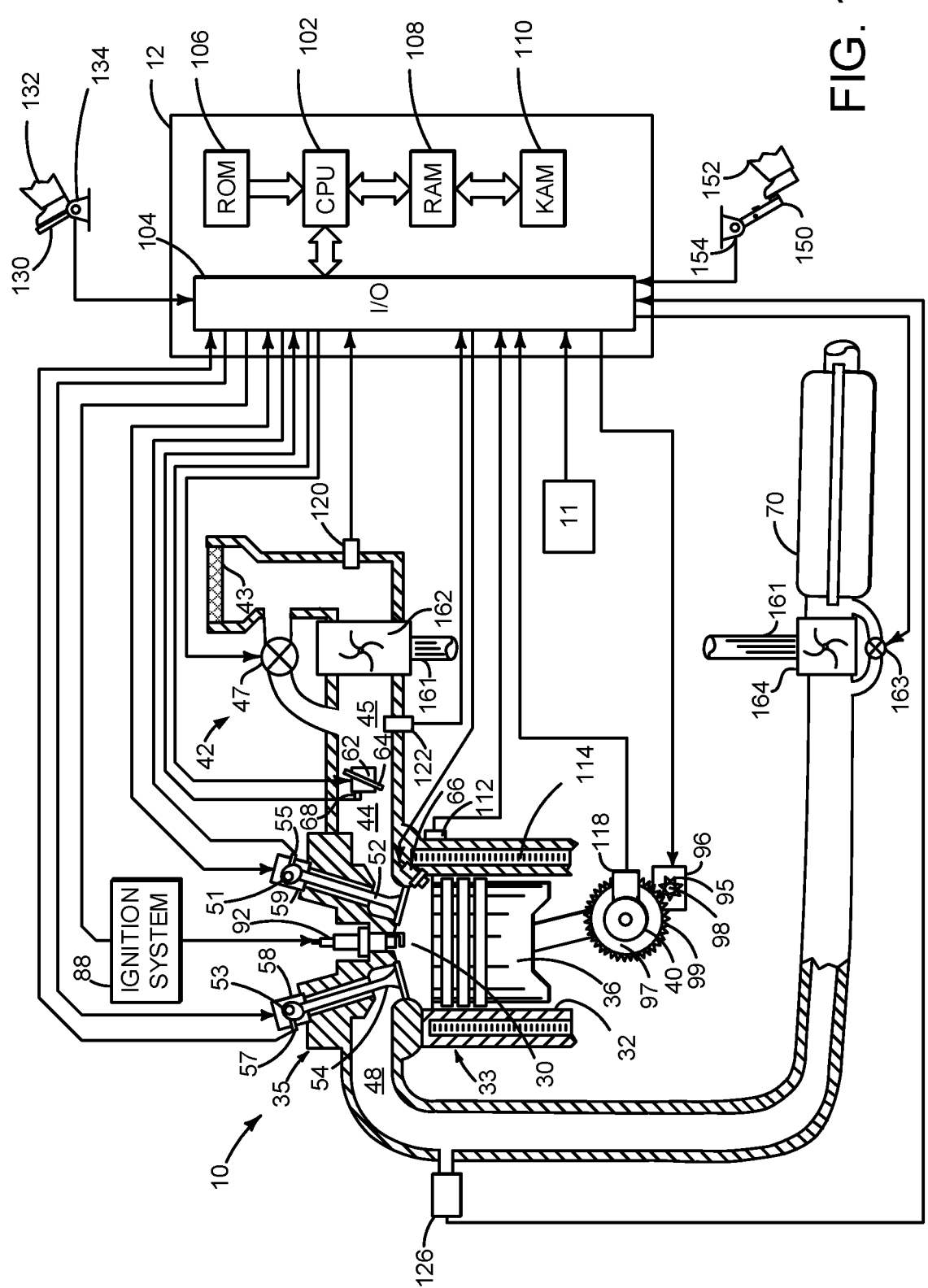
FIG. 1 is a schematic diagram of an engine.
Figure 2:
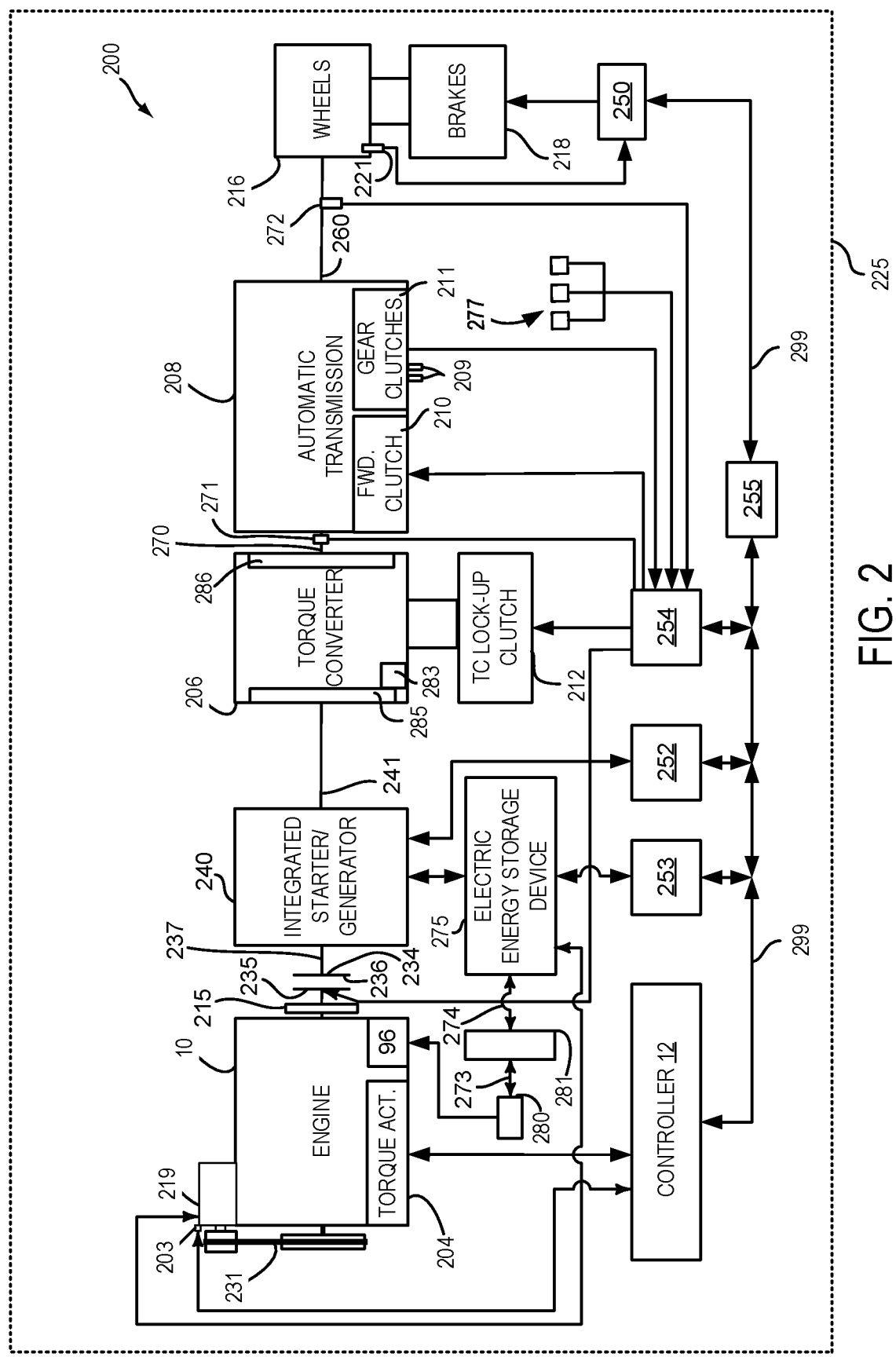
FIG. 2 is a schematic diagram of a hybrid vehicle driveline.
Figure 3:
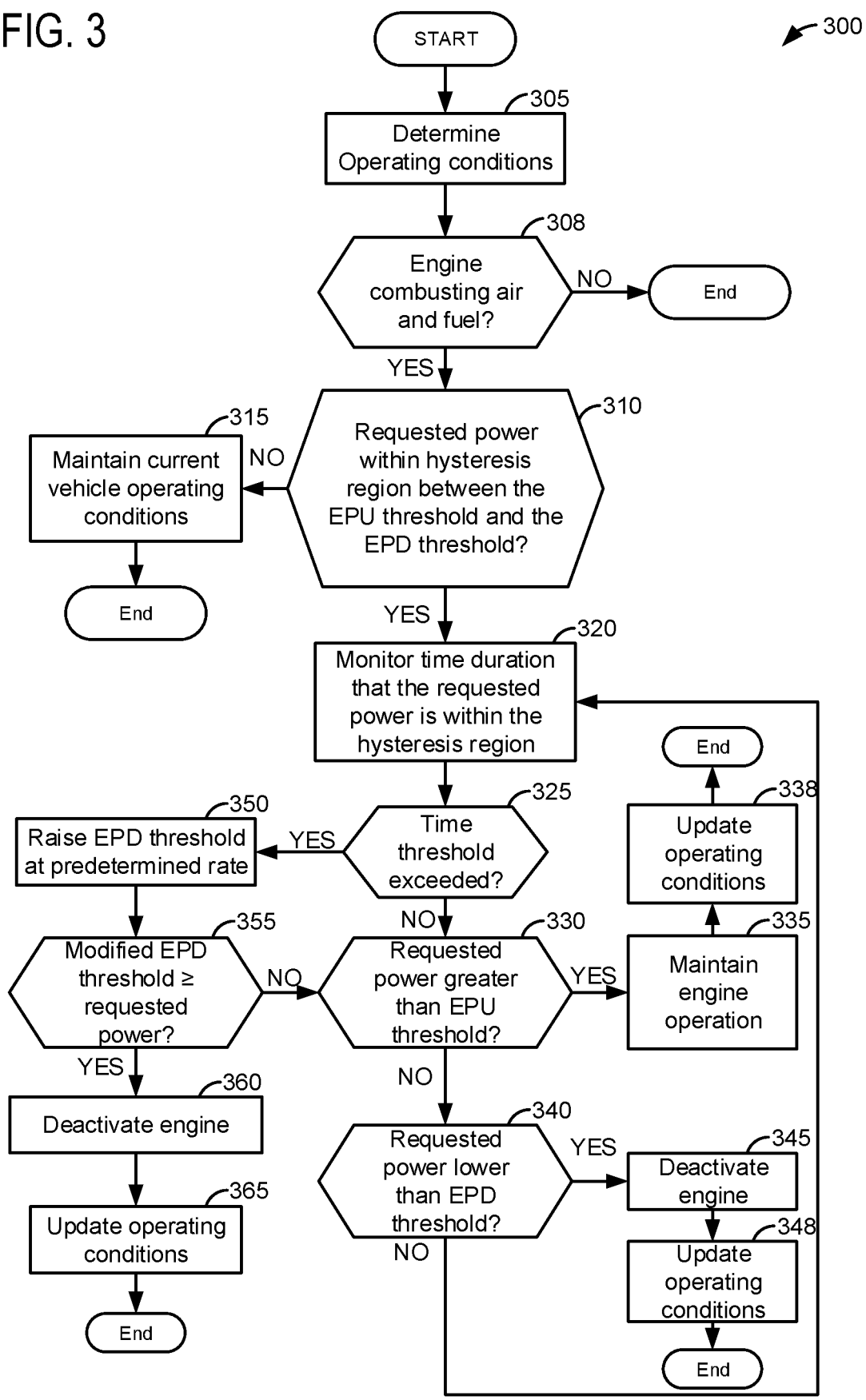
FIG. 3 depicts a high-level example flowchart for obtaining an adjusted engine pull down threshold.
Figure 4:
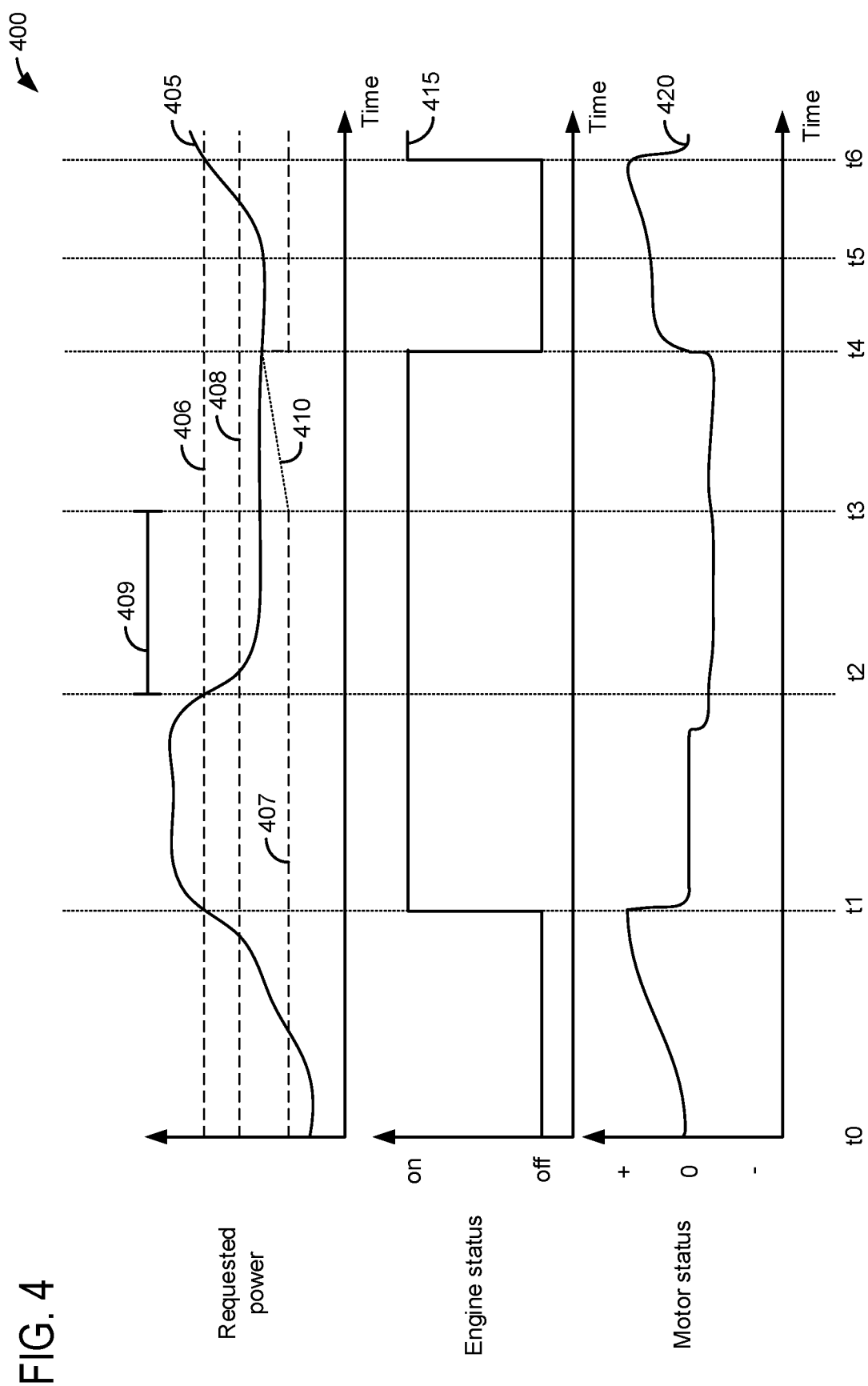
FIG. 4 depicts an example timeline illustrating how the method of FIG. 3 may be used to obtain the adjusted engine pull down threshold.
Figure 5:
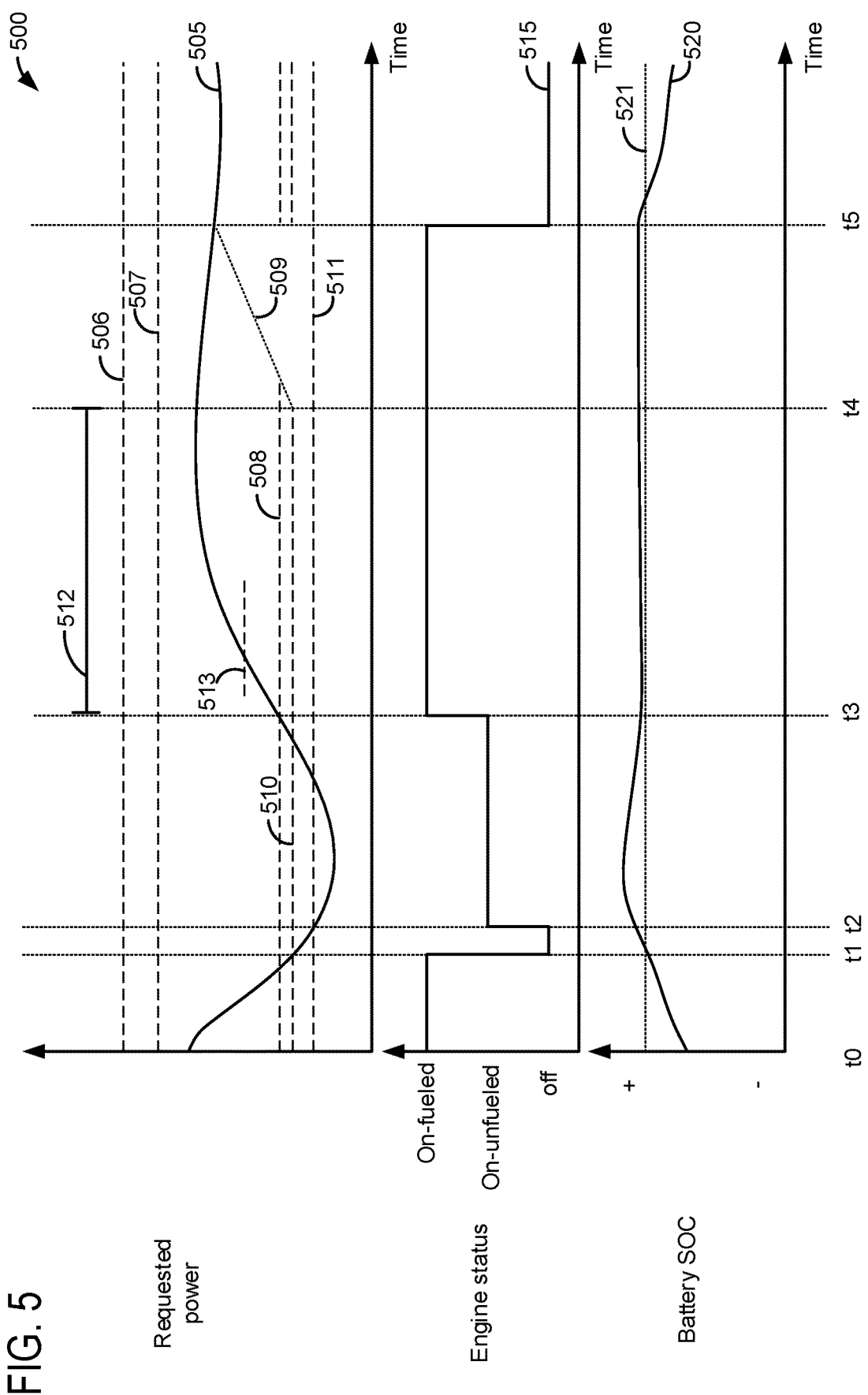
FIG. 5 depicts another example timeline for obtaining an adjusted engine pull down threshold under circumstances where a battery state-of-charge (SOC) is greater than a threshold SOC.
Figure 6:
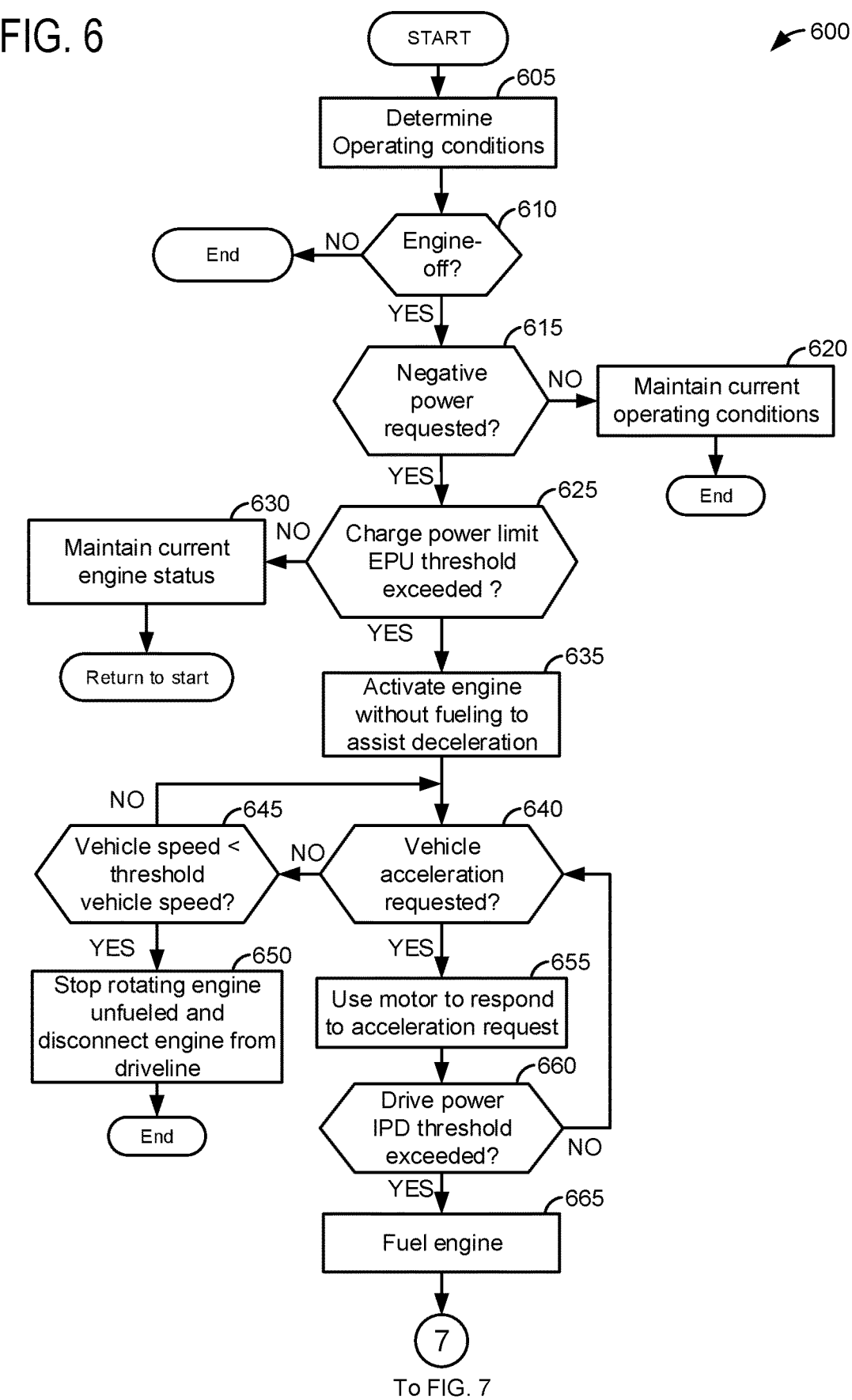
FIGS. 6-7 depict a high-level example flowchart for obtaining the adjusting the engine pull down threshold that corresponds to the timeline of FIG. 5.
Figure 7:
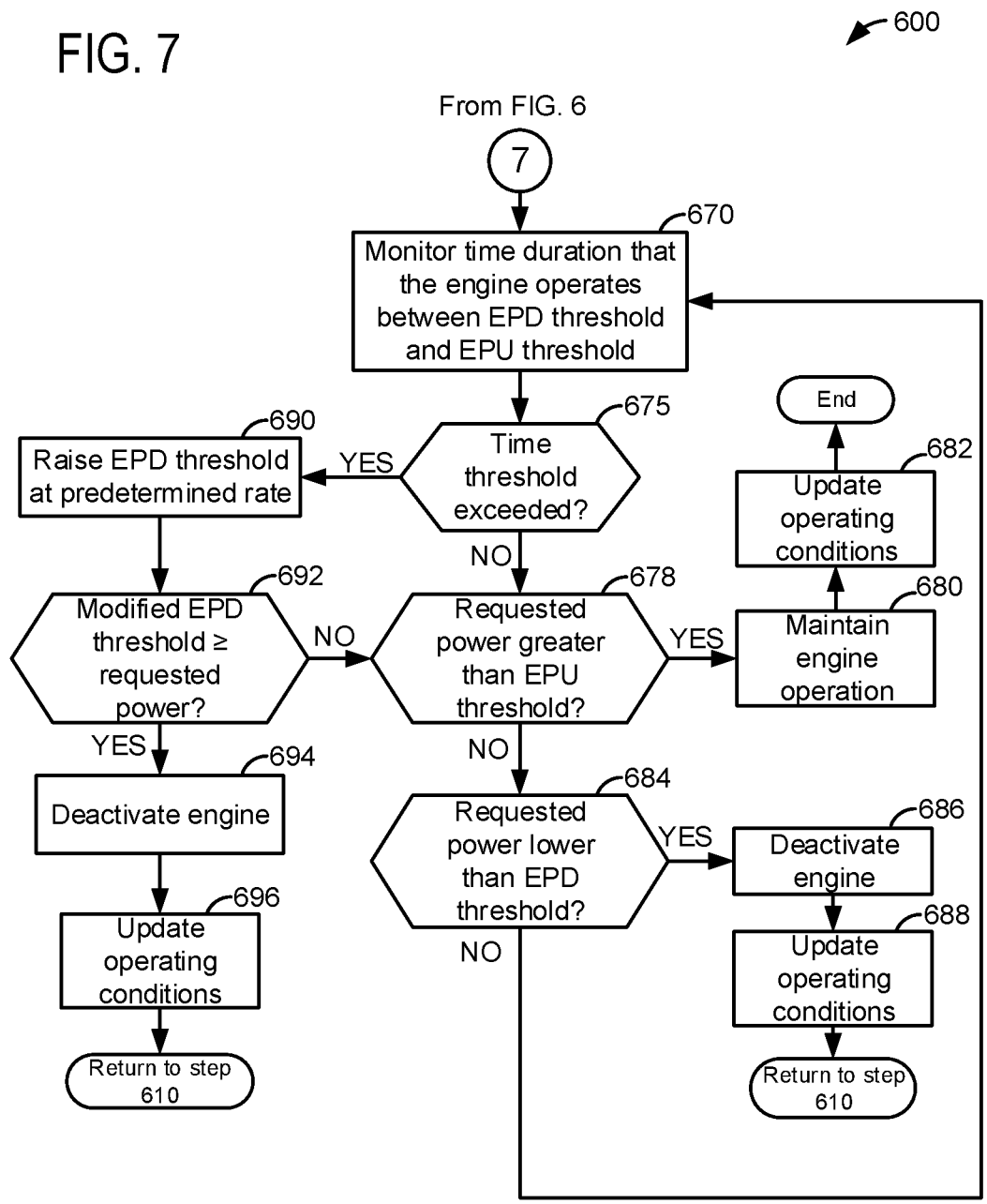

The following description relates to systems and methods for controlling engine shutdown events in a hybrid electric vehicle that is equipped with stop/start capability. Accordingly, FIG. 1 depicts an example engine system relevant to the present disclosure, and FIG. 2 depicts a hybrid vehicle driveline relevant to the present disclosure. FIG. 3 depicts a flowchart for adjusting an engine pull down threshold under circumstances where a power or torque demand from the engine has been below an engine pull up threshold but above an engine pull down threshold for a predetermined duration. An example timeline for controlling engine operation via the method of FIG. 3 is depicted at FIG. 4. Another example timeline for controlling engine operation under circumstances where power or torque requested from the engine is below the engine pull up threshold but above the engine pull down threshold is depicted at FIG. 5. Specifically, FIG. 5 represents a situation where vehicle deceleration is requested and where a battery SOC is greater than a threshold SOC, such that the engine is pulled up without fueling in order to use engine pumping work to decelerate the vehicle. Then, responsive to an increased power or torque demand where the engine is activated to combust air and fuel upon the demand being greater than an inhibit engine pull down threshold (and where requested power from the engine remains in a hysteresis region between the engine pull down threshold and the engine pull up threshold for another predetermined duration), the engine pull down threshold may be adjusted so as to control an engine shut down event. An example flowchart for controlling engine operation in line with the timeline of FIG. 5, is depicted at FIGS. 6-7.

Referring now to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-2 and employs the actuators shown in FIGS. 1-2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Engine 10 may be equipped with a S/S feature 193, wherein the engine 10 may be automatically shut down during times when the vehicle is not moving, or when requested power or torque is below an engine pull down (EPD) threshold. Controller 12 may be connected to engine 10 and S/S feature 193, for performing the start-stop functions. Advantages to the S/S functionality may include an improvement in fuel economy over other vehicles that do not employ such technology.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via a belt integrated starter/generator (BISG) 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vise-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Discussed herein, a system for a hybrid vehicle may comprise an engine, a motor/generator that receives power from an onboard battery. Such a system may further comprise a controller with computer readable instructions stored on non-transitory memory that when executed during an engine-off condition, cause the controller to, while the engine is off and in response to a power or torque demand from an operator of the hybrid vehicle or an autonomous controller being lower than a charge power limit engine pull up threshold under conditions where a state of charge of the onboard battery is greater than a threshold state of charge, commanding the engine to rotate unfueled. In response to the power or torque demand increasing above an inhibit engine pull down threshold while the engine is rotating unfueled, the controller may store instructions to command fueling and spark to the engine, monitor a time duration that the power or torque demand remains in a hysteresis region between an engine pull up threshold and an engine pull down threshold, and if the time duration exceeds a predetermined threshold duration, increase the engine pull down threshold at a predetermined rate to obtain an adjusted engine pull down threshold. The controller may store further instructions to deactivate the engine upon the adjusted engine pull down threshold reaching the power or torque demand while the power or torque demand remains below the engine pull up threshold.

In such a system, the controller may store further instructions to maintain fueling and spark provided to the engine and reset a timer that monitors the time duration in response to the power or torque demand increasing above the engine pull up threshold prior to the time duration exceeding the predetermined threshold duration or in response to the power or torque demand decreasing below the engine pull down threshold prior to the time duration exceeding the predetermined threshold duration.

In such a system, the controller may store further instructions to reset the adjusted engine pull down threshold back to the engine pull down threshold in response to the engine being deactivated as a result of the adjusted engine pull down threshold reaching the power or torque demand. The controller may store further instructions to reset the adjusted engine pull down threshold back to the engine pull down threshold in response to the power or torque demand rising above the engine pull up threshold prior to the adjusted engine pull down reaching the power or torque demand.

In such a system, the controller may store further instructions to command the motor/generator to meet the power or torque demand in response to the adjusted engine pull down threshold reaching the power or torque demand under conditions where the power or torque demand remains below the engine pull up threshold.

Turning now to FIG. 3, a flow chart of a method for controlling engine operation under circumstances where power requested from the engine is below an engine pull up threshold but above an engine pull down threshold for a predetermined duration, is shown. The method of FIG. 3 may be incorporated and may operate in cooperation with the systems of FIGS. 1-2. Further, at least portions of the method of FIG. 3 may be incorporated as executable instructions stored in non-transitory memory while other portions of the method may be performed by a controller transforming operating systems of devices and actuators in the physical world.

At 305, method 300 determines operation conditions. Operating conditions may include but are not limited to engine speed, BISG torque, ISG torque, driver demand torque, presence or absence of BISG control clutch degradation, engine load, ambient temperature, ambient pressure, vehicle speed, and BISG speed. Method 300 proceeds to 308.

At 308, method 300 includes indicating if the engine is combusting air and fuel. In other words, at 308 method 300 includes indicating whether the engine is in operation, with fueling and spark (in spark-ignited engines) provided to the engine. If not, method 300 may end.

Alternatively, if the engine is in operation at 308, method 300 may proceed to 310. At 310, method 300 includes indicating whether requested power is within a hysteresis region between an engine pull up (EPU) threshold and an engine pull down (EPD) threshold. In a more specific example, at 310 method 300 may include indicating whether requested power is within a hysteresis region between a maximum modified EPD threshold (refer to line 408 of timeline 400 depicted at FIG. 4) and the EPD threshold, the maximum modified EPD threshold being less than the EPU threshold but greater than the EPD threshold. In other examples, the maximum modified EPD threshold may be the same as the EPU threshold. Discussed herein, the EPU threshold may comprise a threshold where, if requested power becomes greater than or equal to the EPU threshold while the engine is not already rotating, the engine may be activated to combust air and fuel. Alternatively, the EPD threshold may comprise a threshold where, if requested power becomes less than or equal to the EPD threshold while the engine is combusting air and fuel, the engine may be deactivated where fueling and spark may be discontinued. The requested power may be based on driver demand in the case where a vehicle operator is controlling the vehicle. In another example, the requested power may comprise an amount of power determined by an autonomous controller of the vehicle, in the case of an autonomous vehicle. If the requested power is not within the hysteresis region, method 300 may proceed to 315, where current vehicle operating conditions may be maintained. For example, engine operation may continue. If the motor is additionally being utilized, such operation may be maintained. Method 300 may then end.

Returning to 310, under circumstances where it is indicated that requested power is within the hysteresis region between the EPU threshold and the EPD threshold, method 300 may proceed to 320. Such a situation may be encountered when the engine is initially pulled up to combust air and fuel in response to requested power exceeding the EPU threshold, and where subsequently the requested power enters into the hysteresis region between the EPD threshold and the EPU threshold. At 320, method 300 includes determining an amount of time that the requested power is within the hysteresis region defined by the boundaries of the EPU threshold and the EPD threshold. For example, once requested power is within the hysteresis region between the EPU threshold and the EPD threshold a timer may be started to monitor the duration spent in the region. Continuing to 325, method 300 includes indicating whether the amount of time that the requested power is in the region between the EPU threshold and the EPD threshold exceeds a predetermined threshold duration. The predetermined duration may be selected from a range comprising anywhere from 1-2 seconds to 2-3 minutes. In a preferred example, the range may comprise between 2 seconds and 20 seconds. In a still preferred example, the predetermined duration may comprise 10 seconds.

If, at 325, the predetermined threshold duration is not exceeded, method 300 may proceed to 330. At 330, method 300 may include indicating whether requested power exceeds the EPU threshold. If yes, method 300 may proceed to 335. At 335, method 300 may include maintaining the engine combusting air and fuel. In other words, fueling and spark may continue to be provided to the engine at 335.

Continuing to 338, method 300 may include updating vehicle operating conditions. Specifically, in a case where the requested power entered into the hysteresis region defined by the EPU threshold and the EPD threshold, but where the amount of time spent in that region did not exceed the threshold duration, updating operating conditions at 338 may include resetting the timer for monitoring time spent in the hysteresis region. For example, the timer may start at zero and count up in seconds or fractions thereof, and thus resetting the time may include resetting the value of the timer back to zero seconds. Method 300 may then end.

Returning to 330, if the requested power from the engine is not greater than the EPU threshold, method 300 may proceed to 340. At 340, method 300 may include indicating whether the requested power from the engine is lower than the EPD threshold. It may be understood that the EPD threshold at block 340 refers to an unmodified EPD threshold, as will be elaborated in further detail below. If so, method 300 may proceed to 345 where the engine may be deactivated. In other words, the engine may be pulled down, such that the engine is no longer combusting air and fuel, and the engine may spin to rest. Proceeding to 348, method 300 may include updating operating conditions, which may include resetting the timer for monitoring time spent in the hysteresis region. Furthermore, updating operating conditions may include relying on the motor for propelling the vehicle upon engine deactivation. Method 300 may then end.

Returning to 340, responsive to the requested power not being less than the EPD threshold, method 300 may return to 320, where the amount of time spent in the hysteresis region between the EPU threshold and the EPD threshold is continued to be monitored.

Returning to 325, in response to the amount of time spent in the hysteresis region between the EPD threshold and the EPU threshold exceeding the predetermined time duration, method 300 may proceed to 350. At 350, method 300 may include raising the EPD threshold at a predetermined rate. The predetermined rate at which the EPD threshold is increased may comprise a calibrated rate, for example. In some examples, the predetermined rate at which the EPD threshold is increased may be adjusted. For example in response to an indication that requested power is increasing, the rate at which the EPD threshold is raised may be decreased. Alternatively, in response to an indication that the requested power is decreasing, the rate at which the EPD threshold is raised may be increased. The raised EPD threshold may be referred to herein as a modified EPD threshold, or an adjusted EPD threshold. There may be a maximum amount that the EPD threshold may be increased to, referred to herein as the maximum modified EPD threshold. It may be understood that the maximum modified EPD threshold may be greater than the EPD threshold, also referred to herein as the unmodified EPD threshold, but less than the EPU threshold.

It may be understood that the reason for raising the EPD threshold at the predetermined rate is to mitigate a situation where the vehicle operator may be tipping into the accelerator pedal at the same time (e.g. within 1 second) as when the time threshold (refer to step 325) is exceeded. In a situation where the EPD threshold were instantaneously raised to the maximum modified EPD threshold, an engine shutdown may occur while the vehicle operator is requesting acceleration, which may be unintuitive to the vehicle operator. By raising the EPD threshold at the predetermined rate, in a situation where driver demand is increasing at a rate greater than the rate at which the EPD threshold is being raised, engine shutdown may be avoided.

With the EPD threshold being raised, method 300 may proceed to 355. At 355, method 300 may include indicating whether the modified EPD threshold is greater than or equal to the requested power. If so, then method 300 may proceed to 360. At 360, method 300 may include deactivating the engine. In other words, fueling and spark provided to the engine may be discontinued at 360, such that the engine may spin to rest. Continuing to 365, method 300 may include updating operating conditions. Updating operating conditions at 365 may include reverting back to the unmodified EPD threshold and resetting the timer. In other words, upon the engine being deactivated based on the modified EPD threshold, reliance on the modified EPD threshold may be discontinued and reliance may instead be on the unmodified EPD threshold, until another situation arises where the EPD threshold again is modified as per method 300. Updating operating conditions at 365 may further include commanding the motor to meet the current power request in lieu of engine operation. Method 300 may then end.

Thus, based on the above it may be understood that the EPD threshold may be modified or adjusted in real time during engine operation while continually and repeatedly comparing the adjusted EPD threshold to driver demand. Thus, it may be further understood that the comparing continually and repeatedly also is conducted in real time.

Returning to 355 under circumstances where the EPD threshold is being raised but where the requested power remains above the modified EPD threshold, method 300 may proceed to 330. At 330, method 300 may include indicating whether the requested power exceeds the EPU threshold. If so, engine operation may be maintained at 335, and operating conditions may be updated at 338. Updating operating conditions at 338 may include resetting the modified EPD threshold, or in other words, reverting back to reliance on the unmodified EPD threshold, similar to that discussed above at 365. Additionally, the timer may be reset. In some examples, the modified EPD threshold may be reverted back to the unmodified threshold and the timer may be reset immediately. In other examples, the modified EPD threshold may be reverted back to the unmodified EPD threshold and the timer may be reset responsive to requested power being maintained above the EPU threshold for a preset duration (e.g. 1 second, 2 seconds, 3 seconds, etc.).

Returning to 330, in a case where the EPD threshold is being raised and where the requested power does not exceed the EPU threshold, method 300 may proceed to 340. As discussed above, decision block 340 queries whether requested power is below the unmodified EPD threshold. In a case where the EPD threshold is being modified, there cannot be a situation where requested power is below the unmodified EPD threshold without the modified EPD threshold having been crossed, which would result in engine shutdown. Accordingly, when the EPD threshold is being modified, output from decision block 340 is no, and method 300 may return to 320 and from there continue to raise the EPD threshold as discussed.

Turning now to FIG. 4, an example timeline 400 is depicted, illustrating how the EPD threshold may be modified as discussed above with regard to the method of FIG. 3. Timeline 400 includes plot 405, indicating power requested, for example, via a vehicle operator or an autonomous controller, over time. Line 406 represents the EPU threshold, line 407 represents the unmodified EPD threshold, and line 408 represents a maximum amount that the EPD threshold may be adjusted to. Line 409 represents the predetermined threshold duration that, when exceed while the requested power is within the hysteresis region defined by the EPU threshold and the unmodified EPD threshold, results in the EPD threshold beginning to be modified. Accordingly, line 410 represents the modified or adjusted EPD threshold.

Timeline 400 further includes plot 415, representing engine status (on or off), over time. It may be understood that for example timeline 400, when the engine is off, the engine is not combusting fuel, and may be understood to be at rest or spinning to rest. Alternatively, when the engine is on, it may be understood that fueling and spark are being provided to the engine. Timeline 400 further includes plot 420, indicating status of a motor (e.g. 240), over time. The motor may provide positive (+) or negative (−) torque to the driveline, or may be off (0), over time.

At time t0, the engine is off (plot 415) and requested power is below the unmodified EPD threshold (line 407). Between time t0 and time t1, with the engine off, requested power (plot 405) is provided via the motor (plot 420). At time t1, requested power crosses the EPU threshold (line 406) and accordingly, the engine is activated to combust air and fuel (plot 415). With the engine on, the contribution from the motor is phased out (plot 420). Between time t1 and t2, the engine is used to provide the requested power.

Beginning at time t2, requested power drops into the hysteresis region defined by the EPU threshold (line 406) and the EPD threshold (line 407). Because requested power does not drop below the EPD threshold, engine operation is maintained (plot 405). Once requested power is in the hysteresis region, the amount of time spent in the hysteresis region is monitored.

At time t3 it is indicated that the predetermined threshold duration (line 409) is exceeded. In other words, requested power has been maintained within the hysteresis region for greater than the predetermined threshold duration at time t3. Accordingly, beginning at time t3 the EPD threshold begins increasing at a predetermined rate. In this example timeline, the predetermined rate comprises a calibrated rate that is not adjusted based on requested power, however in other examples it may be understood that the predetermined rate may be selected as a function of the requested power demand, as discussed above. The increasing EPD threshold is, as discussed, referred to as the modified or adjusted EPD threshold (line 410). It may be understood that the modified EPD threshold may increase to a maximum amount defined by the maximum modified EPD threshold (line 408). However, in this example timeline the maximum modified EPD threshold is not reached, because at time t4 the modified EPD threshold (line 410) reaches, or in other words, equals, the requested power. Accordingly, at time t4, the engine is deactivated (plot 415), and the modified EPD threshold reverts back to the unmodified EPD threshold (line 407). As depicted, the modified EPD threshold immediately reverts back to the unmodified EPD threshold. However, in other examples (not shown) the modified EPD threshold may be reverted back to the unmodified EPD threshold at a controlled rate. An advantage to reverting back to the unmodified EPD threshold immediately (e.g. a step change), may be to ensure that any rapid changes in driver demand may be mitigated by the EPD threshold (unmodified) and the EPU threshold. If the modified EPD threshold were to be reverted back to the EPD threshold at a controlled rate, there may be potential for undesired engine on/off cycling in response to rapidly changing driver demand. With the engine deactivated, contribution from the motor provides the requested power between time t4 and t5. At time t5, requested power begins increasing, and the increase is met with the motor until requested power crosses the EPU threshold at time t6. Upon requested power being greater than the EPU threshold at time t6, the engine is activated to combust air and fuel (plot 415), and contribution from the motor is phased out (plot 420).

In this way, under conditions where requested power is such that it may be more economical from a fuel efficiency standpoint to rely on the motor instead of the engine, but where such action is being prevented by the requested power being above the unmodified EPD threshold, the EPD threshold may be modified such that the engine is shut down and the motor instead is relied upon for meeting the requested power demand.

Based on the methodology discussed with regard to FIG. 3 and the timeline of FIG. 4, it may be understood that the EPD threshold may be modified, but that the EPU threshold is not modified. Maintaining the EPU threshold unmodified may serve to avoid situations where meeting driver demand via the motor alone may be inefficient and/or may result in a situation where driver demand cannot be met. For example, the EPU threshold may be set at a point just below a maximum capability of the battery. Due to losses inherent within the high voltage battery, meeting driver demand by the motor alone above the EPU threshold may be inefficient and/or impossible.

Turning now to FIG. 5, another example timeline 500 is depicted, illustrating another manner in which to control engine operation to improve overall fuel efficiency. Timeline 500 corresponds to the methodology depicted at FIG. 6, and timeline 500 is presented prior to discussing the methodology of FIG. 6 to introduce relevant terminology used by the methodology of FIG. 6. Briefly, timeline 500 corresponds to a situation where vehicle deceleration is requested under circumstances where the battery can no longer continue to accept charge in the form of regenerative braking energy. Accordingly, to assist with deceleration, the engine is pulled up unfueled, such that pumping losses help to decelerate the vehicle. Then, in response to a requested power exceeding a threshold referred to herein as an inhibit pull down (IPD) threshold while the engine is spinning without being fueled, fuel and spark may be provided to the engine. With the engine thus fueled, an amount of time that the requested power spends in a hysteresis region defined by the EPU threshold and the EPD threshold is determined in similar fashion to that discussed above, and in response to the amount of time spent being greater than a predetermined threshold duration, the EPD threshold (and IPD threshold) may be modified together so that the engine may be shut down if requested power does not rise above the EPU threshold. It may be understood that the predetermined threshold duration discussed with regard to the timeline of FIG. 5 and the methodology of FIG. 6 may be the same as, or different from the predetermined threshold duration discussed above with regard to the methodology of FIG. 3 and the timeline of FIG. 4. Discussed herein, the predetermined duration corresponding to the methodology of FIG. 3 and the timeline of FIG. 4 may be referred to as a first predetermined threshold duration, whereas the predetermined duration corresponding to the methodology of FIG. 6 and the timeline of FIG. 5 may be referred to as a second predetermined threshold duration.

Timeline 500 includes plot 505, indicating requested power via a vehicle operator or an autonomous controller, over time. Line 506 represents the EPU threshold, and line 507 represents a maximum amount that the EPD threshold and IPD threshold may be modified, as will be further elaborated below. Line 508 represents the IPD threshold, and line 510 represents the unmodified EPD threshold. Line 509 represents a modified EPD threshold. Line 511 represents a charge power limit EPU threshold, which may be understood to comprise a threshold where the engine may be pulled up unfueled to assist in decelerating the vehicle due to the battery being unable to accept further charge. Line 513 represents a charge power limit EPD threshold, which if surpassed while the engine is spinning unfueled may result in the engine being pulled down (e.g. stopped from spinning unfueled), under circumstances where the IPD threshold is not relied upon, which will be elaborated in further detail below. Line 512 represents the second predetermined threshold duration.

Timeline 500 further includes plot 515, indicating engine status, over time. The engine may be off where the engine is not fueled and no spark is provided, which in some examples may include the engine not spinning and may additionally or alternatively include the engine not being connected to the driveline. In another condition, the engine may be on but unfueled, in other words the engine may be spinning unfueled and connected to the driveline. In still another condition the engine may be on, with fueling and spark provided and with the engine connected to the driveline. Timeline 500 further includes plot 520, depicting battery SOC, over time. Line 521 represents a threshold SOC where at or above the threshold SOC it may be understood that the battery can no longer accept additional charge from regenerative braking efforts.

At time t0, the engine is on and is fueled (plot 515), and requested power (plot 505) is between the EPU threshold (line 506) and the EPD threshold (line 510). Battery SOC is below the threshold SOC (line 521). Between time t0 and t1, vehicle deceleration is being requested (plot 505), and at time t1 requested power reaches the EPD threshold (line 510). With the battery SOC below the threshold SOC, it may be understood that vehicle deceleration is being assisted via the use of regenerative braking energy to slow the vehicle. At time t1 the engine is turned off, and it is additionally indicated that battery SOC has risen above the SOC threshold. Accordingly, the battery cannot continue to accept further charge via the use of regenerative braking to decelerate the vehicle.

At time t2, requested power reaches the charge power limit EPU threshold (line 511), and accordingly, at time t2 the engine is pulled up without fueling so that engine pumping losses may assist in decelerating the vehicle.

However, between time t2 and t3, slight increases to the requested power are indicated (plot 505). It may be understood that the charge power limit EPD threshold (line 513) represents a threshold where, if reached while the engine is spinning unfueled, may result in the engine being pulled down again. However, it may be undesirable for small positive driver demands to result in engine pull downs when in the engine-spinning unfueled state, only to result in another engine pull up coming as soon as negative power is again requested or if enough positive driver demand is requested. To prevent such pull-up/pull down cycles, the IPD threshold (line 508) may be relied upon. Specifically, once requested power is above the IPD threshold, the engine may be prevented from being shut down unless requested power drops below the EPD threshold (line 510). In other words, the IPD threshold may serve to override the charge power limit EPD threshold (line 513), by preventing the engine from pulling down once requested power is above the IPD threshold (line 508) unless requested power drops below the EPD threshold. Thus, it may be further understood that once requested power is above the IPD threshold, fueling to the engine may be provided. In other words, when the engine is spinning unfueled and requested power rises above the IPD threshold, fueling may be provided to the engine because, if the engine were not fueled, propulsion would have to be provided by the motor and the motor would have to overcome the pumping work of the unfueled engine rotation. Then, the engine may remain on and fueled until requested power drops below the EPD threshold (plot 510). The IPD threshold (line 508) thus differs from the EPU threshold (line 506) in that the IPD threshold is used to commence fueling the engine under conditions where the engine is already rotating but is unfueled, whereas the EPU threshold is used to commence fueling the engine under conditions where the engine is not already rotating unfueled.

Accordingly, at time t3, the requested power (plot 505) becomes greater than the IPD threshold (line 508), and thus fueling and spark are provided to the spinning engine at time t3. Because the requested power is greater than the IPD threshold between time t3 and t4, the engine is prevented from being pulled down even though battery SOC remains above the SOC threshold and requested power rises above the charge power limit EPD threshold (line 513).

Once the requested power has risen above the IPD threshold at time t3, the duration of time spent within the hysteresis region defined by the EPU threshold (line 506) and the EPD threshold (line 510) is monitored and compared with the second predetermined threshold duration. At time t4, the second threshold duration elapses without requested power exceeding the EPU threshold (line 506) or dropping below the EPD threshold (line 510). Accordingly, the EPD threshold begins being modified at time t4. Similar to that discussed above, modifying the EPD threshold may comprise increasing the EPD threshold at a predetermined rate which may comprise a calibratable rate, and which may be adjustable in similar fashion as that discussed above. It may be understood that, once the EPD threshold which is being raised increases to the IPD threshold, both the EPD threshold and the IPD threshold are increased together at the same rate.

At time t5, the modified or adjusted EPD threshold (line 509) reaches the requested power, and as such, the engine is turned off (plot 515). With the modified EPD threshold resulting in the shutting down of the engine at time t5, the IPD threshold and the EPD threshold are reset to the values they were set at prior to the modifying. With the engine having been shut down at time t5, the motor is relied upon for delivering the requested power, and accordingly, battery SOC begins to decline after time t6. In this way, battery SOC may be reduced so as to not remain stuck in a position of high SOC.

Thus, discussed herein, a method may comprise, with an engine combusting air and fuel and a driver demand between an engine pull up threshold and an engine pull down threshold, raising the engine pull down threshold to obtain an adjusted engine pull down threshold, and discontinuing engine operation in response to the adjusted engine pull down threshold reaching the driver demand while the driver demand remains below the engine pull up threshold.

In such a method, raising the engine pull down threshold to obtain the adjusted engine pull down threshold may further comprise raising the engine pull down threshold at a predetermined rate, where the predetermined rate is adjustable as a function of the driver demand.

In such a method, the method may further comprise raising the engine pull down threshold in response to the driver demand being between the engine pull up threshold and the engine pull down threshold for greater than a predetermined duration. Furthermore, under conditions where the driver demand does not remain between the engine pull up threshold and the engine pull down threshold for greater than the predetermined duration but instead drops below the engine pull down threshold, the method may include discontinuing engine operation.

In such a method, the method may further comprise resetting the adjusted engine pull down threshold to the engine pull down threshold in response to the adjusted pull down threshold reaching the driver demand while the driver demand remains below the engine pull up threshold.

In such a method, the method may further comprise resetting the adjusted pull down threshold to the engine pull down threshold in response to the driver demand becoming greater than the engine pull up threshold prior to the adjusted pull down threshold reaching the driver demand.

In such a method, the method may further comprise commanding a motor/generator to meet the driver demand while the driver demand remains between the engine pull up threshold and the engine pull down threshold subsequent to engine operation being discontinued due to the adjusted engine pull down threshold reaching the driver demand.

In such a method, raising the engine pull down threshold may further comprise stopping raising the engine pull down threshold when a maximum adjusted engine pull down threshold is attained without the adjusted engine pull down threshold reaching the driver demand while the driver demand remains below the engine pull up threshold. The maximum adjusted engine pull down threshold may be lower than the engine pull up threshold.

In such a method, the engine combusting air and fuel with the driver demand between the engine pull up threshold and the engine pull down threshold is in response to a vehicle deceleration request where the driver demand drops below the engine pull up threshold but remains above the engine pull down threshold.

In such a method, the engine combusting air and fuel with the driver demand between the engine pull up threshold and the engine pull down threshold is in response to an increasing driver demand where the engine is commanded to combust air and fuel upon the increasing driver demand becoming greater than an inhibit engine pull down threshold that is greater than the engine pull down threshold but lower than the engine pull up threshold.

Another example of a method may comprise in response to a power or torque demand increasing above an inhibit pull down threshold while an engine is rotating unfueled, providing fueling and spark to the engine and monitoring a time duration that the power or torque demand remains in a hysteresis region between a maximum modified engine pull down threshold and an engine pull down threshold. The maximum modified engine pull down threshold may be less than an engine pull up threshold but greater than the engine pull down threshold. Responsive to the power or torque demand remaining in the hysteresis region for greater than a predetermined threshold duration, the method may include obtaining an adjusted engine pull down threshold and deactivating the engine upon the adjusted engine pull down threshold reaching the power or torque demand while the power or torque demand remains below the engine pull up threshold.

In such a method, the inhibit pull down threshold may be greater than the engine pull down threshold but lower than the engine pull up threshold and the maximum modified engine pull down threshold.

In such a method, under conditions where fueling and spark is provided to the engine upon the power or torque demand increasing above the inhibit pull down threshold, the method may include preventing the engine from being shut down unless the power or torque demand drops below the engine pull down threshold prior to the predetermined threshold duration elapsing.

In such a method, obtaining the adjusted engine pull down threshold may further comprises raising the engine pull down threshold at a predetermined rate.

In such a method, the engine rotating unfueled may be a result of a state of charge of an onboard battery being greater than a threshold state of charge. The engine may be commanded to rotate unfueled in response to the power or torque demand being lower than a charge power limit engine pull up threshold under conditions where the state of charge of the onboard battery is greater than the threshold state of charge, and where the charge power limit engine pull up threshold is lower than the engine pull down threshold and the maximum modified engine pull down threshold.

In such a method, the method may further comprise resetting the adjusted engine pull down threshold back to the engine pull down threshold in response to the engine being deactivated upon the adjusted engine pull down threshold reaching the power or torque demand while the power or torque demand remains below the engine pull up threshold, or in response to the power or torque demand increasing above the engine pull up threshold prior to the adjusted engine pull down threshold reaching the power or torque demand.

In such a method, the method may further comprise meeting the power or torque demand via a motor/generator in response to the engine being deactivated upon the adjusted engine pull down threshold reaching the power or torque demand under conditions where the power or torque demand remains below the engine pull up threshold.

Turning now to FIGS. 6-7, a flow chart of a method 600 for controlling engine operation as discussed with regard to the timeline of FIG. 5 is shown. The method of FIG. 6 may be incorporated and may operate in cooperation with the systems of FIGS. 1-2. Further, at least portions of the method of FIGS. 6-7 may be incorporated as executable instructions stored in non-transitory memory while other portions of the method may be performed by a controller transforming operating systems of devices and actuators in the physical world.

At 605, method 600 determines operation conditions. Operating conditions may include but are not limited to engine speed, BISG torque, ISG torque, driver demand torque, presence or absence of BISG control clutch degradation, engine load, ambient temperature, ambient pressure, vehicle speed, and BISG speed. Method 600 proceeds to 610.

At 610, method 600 includes indicating whether the engine is off or not. More specifically, at 610, method 600 includes determining whether the engine is not combusting air and fuel and is not spinning while connected to the driveline. If such conditions are not indicated to be met at 610, method 600 may end.

Alternatively, if the engine is indicated to be off, method 600 may proceed to 615. At 615, method 600 includes indicating whether negative power is being requested. In other words, at 615 it is indicated as to whether requested power via the vehicle operator or autonomous controller is negative. If not, then method 600 may proceed to 620, where current conditions may be maintained. For example, the engine may be off but requested power may be positive, in which case the motor (e.g. 240) may be relied upon for providing the requested power until the EPU threshold is exceeded. In other examples requested power may be steady. Accordingly, at 620 such operating conditions may be maintained, and method 600 may end.

Returning to 615, responsive to the engine being off and requested power being negative, method 600 may proceed to 625. At 625, method 600 may include indicating whether the requested power drops below the charge power limit EPU threshold (e.g. 511). If such conditions are not indicated at 625, method 600 may proceed to 630, where current engine status may be maintained. It may be understood that the charge power limit EPU threshold may comprise a dynamically calculated threshold based on at least battery SOC and battery temperature. Thus, in a situation where battery SOC is below the SOC threshold, the charge limit EPU threshold may be adjusted lower, which may thus result in the charge power limit EPU threshold being unattainable at the current driver demand. IN such an example, regenerative braking may continue to be relied upon for decelerating the vehicle and the engine may be maintained off. Method 600 may then return to the start of method 600. For example, with the engine off, method 600 may again proceed to 615, where it is further queried as to whether continued deceleration is requested. If not, this may mean that either the vehicle is stopped, or acceleration is being requested. As discussed above, in a case where acceleration is being requested the engine may be maintained off and the motor relied upon for meeting the requested power, until the EPU threshold is reached. Alternatively, in another example vehicle deceleration may not be requested once the vehicle has come to a stop. In either case, current operating conditions may be maintained and method 600 may end.

Returning to 625, in a case where the requested power drops below the charge power limit EPU threshold and where the battery can no longer accept charge via regenerative braking energy, method 600 may proceed to 635. At 635, method 600 may include activating the engine without fueling to assist in the deceleration request. In other words, at 635 method 600 may include spinning the engine unfueled with the engine connected to the driveline, such that engine pumping losses help to slow the vehicle along with any friction braking concurrently being used to slow the vehicle.

With the engine on without fueling at 635, method 600 may proceed to 640. At 640, method 600 may include indicating whether vehicle acceleration is requested. In other words, at 640, method 600 may include determining whether an increase in requested power is indicated. If not, method 600 may proceed to 645, where it may be determined as to whether a speed of the vehicle is below a threshold vehicle speed. If the vehicle speed is below the threshold vehicle speed, then method 600 may proceed to 650. At 650, method 600 may include canceling the request to rotate the engine unfueled, and the engine may shut down and may be disconnected from the driveline. At vehicle speeds below the threshold vehicle speed, it may be understood that friction braking may be used to meet the braking request. Method 600 may then end.

Alternatively, at 645, if the vehicle has not yet come to a stop, method 600 may return to 640 where it may be determined whether an increase in requested power is indicated. Under conditions where an increase in requested power is determined at 640, method 600 may proceed to 655. At 655, method 600 may include relying on the motor to respond to the acceleration request. In other words, responsive to the acceleration request, the engine may not immediately be fueled, but rather the motor may be used to initially respond to the requested increase in power.

Continuing to 660, method 600 may include indicating whether requested power is greater than the IPD threshold (e.g. 508). If not, method 600 may return to 640. Alternatively, responsive to the requested power being greater than the IPD threshold at 660, method 600 may proceed to 665. At 665, method 600 may include providing fueling and spark to the engine.

While the depicted methodology pertaining step 655 includes relying on the motor to respond to the acceleration request, it may be understood that in other examples the motor may not be relied upon, but rather in response to an acceleration request method 600 may proceed directly to step 665 where fueling and spark may be commanded to the engine. In other words, commanding fueling to the engine may not be entirely dependent on particular thresholds (e.g. IPD threshold) being reached or exceeded. In such a case, similar to that discussed above with regard to the timeline of FIG. 5, with the engine combusting air and fuel, responsive to driver demand being greater than the IPD threshold, the engine may be prevented from being pulled down unless driver demand drops below the EPD threshold.

Continuing to FIG. 7, method 600 continues at step 670. As discussed above with regard to the timeline of FIG. 5, once the requested power is greater than the IPD threshold, time spent in the hysteresis region between the EPU threshold (e.g. 506) and the EPD threshold (e.g. 510) may be monitored. Continuing to 675, method 600 may include indicating whether the second predetermined threshold duration is exceeded or not. If not, method 600 may proceed to 678, where it may be determined as to whether requested power is greater than the EPU threshold. If so, fueled engine operation may be maintained, and at 682 method 600 may include updating operating conditions. Updating operating conditions may include resetting the timer for time spent in the hysteresis region between the EPU threshold and the EPD threshold. Method 600 may then end.

Returning to 678, in a situation where requested power is not greater than the EPU threshold, method 600 may proceed to 684. At 684, method 600 may include indicating whether requested power has decreased to below the EPD threshold. If so, method 600 may proceed to 686, where the engine may be deactivated. In other words, the engine may be pulled down with fueling and spark discontinued. Proceeding to 688, method 600 may include updating operating conditions. Specifically, the timer for monitoring time spent in the hysteresis region between the EPU threshold and the EPD threshold may be reset. In a preferred example, the timer may be reset immediately. In other examples, the timer may be reset after a preset duration (e.g. 1 second, 2 seconds, 3 seconds, etc.). Method 600 may then return to step 610 of method 600.

Returning to 675, in a situation where the time spent in the hysteresis region between the EPU threshold and the EPD threshold is greater than the second predetermined threshold duration, method 600 may proceed to 690. At 690, method 600 may include raising the EPD threshold at the predetermined rate, as discussed above with regard to the timeline of FIG. 5. It may be understood that, as the EPD threshold is being raised, when the EPD threshold reaches the IPD threshold, both the EPD threshold and the IPD threshold rise at the same predetermined rate, and the thresholds overlap one another such that there is no difference between the EPD threshold and the IPD threshold (refer to the timeframe between time t4 and t5 at FIG. 5).

Continuing to 692, method 600 includes indicating whether the modified EPD threshold has reached the amount of power requested via the vehicle operator or autonomous controller. If not, method 600 may proceed to 678, where it may be determined as to whether requested power has reached or exceeded the EPU threshold. If so, then method 600 may proceed to 680, where engine operation may be maintained. Continuing to 682, updating operating conditions may include resetting the timer, and returning both the IPD threshold and EPD threshold to their original, unmodified levels. In a preferred example, responsive to the EPU threshold being reached or exceeded, the timer may be reset immediately, and both the IPD threshold and the EPD threshold may be returned to their original, unmodified level immediately. However, in other examples, resetting the timer and returning both the IPD threshold and EPD threshold to their original, unmodified levels may be in response to requested power remaining above the EPU threshold for a preset duration (e.g. 1 second, 2 seconds, 3 seconds, etc.).

Returning to 678, if requested power is not greater than the EPU threshold, method 600 may proceed to 684. However, in a case where the requested power is not below the modified EPD threshold (see step 692), output from decision block 684 is "no", which results in method 600 looping back to step 670 where method 600 proceeds to step 692 since the threshold time has been exceeded.

At 692, responsive to the modified EPD threshold reaching the requested power level, method 600 may proceed to 694. At 694, method 600 may include deactivating the engine, or in other words, fueling and spark may be discontinued. It may be understood that by deactivating the engine under such circumstances, the motor may be relied upon for meeting the current requested power, which may thus enable the battery to discharge rather than remaining stuck at a high SOC (refer to the time after time t5 at FIG. 5). By enabling the battery to discharge, in some examples subsequent requests for deceleration may be met via regenerative braking, rather than relying on unfueled engine operation.

Proceeding to 696, method 600 may include updating operating conditions. Updating operating conditions at 696 may include resetting the timer and resetting both the IPD threshold and the EPD threshold to their original, unmodified levels. Method 600 may then return to 610.

In this way, when an engine of a hybrid vehicle is combusting air and fuel, but where requested power from a vehicle operator remains within a hysteresis region between an EPU threshold and an EPD threshold for greater than a predetermined duration, the EPD threshold may be modified so as to enable the engine to be shut down to allow for the motor to meet the power request. By shutting down the engine under situations where the motor may effectively meet the requested power level, fuel economy may be improved.

The technical effect of increasing the EPD threshold at a predetermined rate after it is indicated that requested power has remained in the hysteresis region between the EPU threshold and the EPD threshold is to encourage engine shut down under circumstances where it is known that the requested power is at a level where the motor may effectively meet the request, as opposed to simply increasing the EPD threshold and EPU threshold any time engine operation has been maintained for a predetermined duration of time. The technical effect of resetting the modified EPD threshold in response to the engine being shut down when the modified EPD threshold reaches the requested power level is that situations where electrical energy is being used to meet a power request but where engine operation may be more efficient may be avoided, as compared to situations where both the EPD threshold and the EPU threshold are raised any time the engine is indicated to be in operation for a predetermined duration of time. The technical effect of raising the EPD threshold under circumstances where requested power is between the EPU threshold and the EPD threshold and where the battery cannot accept further charge is that the battery may be allowed to discharge by relying on the motor to meet the power request, as opposed to the engine, which may be beneficial for regenerative braking operations.

The systems discussed herein, with regard to FIGS. 1-2, along with the methods discussed herein and with regard to FIG. 3 and FIGS. 6-7, may enable one or more systems and one or more methods. In one example, a method comprises with an engine combusting air and fuel and a driver demand between an engine pull up threshold and an engine pull down threshold, raising the engine pull down threshold to obtain an adjusted engine pull down threshold; and discontinuing engine operation in response to the adjusted engine pull down threshold reaching the driver demand while the driver demand remains below the engine pull up threshold.

In a first example of the method, the method further includes wherein raising the engine pull down threshold to obtain the adjusted engine pull down threshold further comprises raising the engine pull down threshold at a predetermined rate, where the predetermined rate is adjustable as a function of the driver demand. A second example of the method optionally includes the first example, and further comprises raising the engine pull down threshold in response to the driver demand being between the engine pull up threshold and the engine pull down threshold for greater than a predetermined duration; and under conditions where the driver demand does not remain between the engine pull up threshold and the engine pull down threshold for greater than the predetermined duration but instead drops below the engine pull down threshold, discontinuing engine operation. A third example of the method optionally includes any one or more or each of the first and second examples, and further comprises resetting the adjusted engine pull down threshold to the engine pull down threshold in response to the adjusted pull down threshold reaching the driver demand while the driver demand remains below the engine pull up threshold. A fourth example of the method optionally includes any one or more or each of the first through third examples, and further comprises resetting the adjusted pull down threshold to the engine pull down threshold in response to the driver demand becoming greater than the engine pull up threshold prior to the adjusted pull down threshold reaching the driver demand. A fifth example of the method optionally includes any one or more or each of the first through fourth examples, and further comprises commanding a motor/generator to meet the driver demand while the driver demand remains between the engine pull up threshold and the engine pull down threshold subsequent to engine operation being discontinued due to the adjusted engine pull down threshold reaching the driver demand. A sixth example of the method optionally includes any one or more or each of the first through fifth examples, and further includes wherein raising the engine pull down threshold further comprises stopping raising the engine pull down threshold when a maximum adjusted engine pull down threshold is attained without the adjusted engine pull down threshold reaching the driver demand while the driver demand remains below the engine pull up threshold; and wherein the maximum adjusted engine pull down threshold is lower than the engine pull up threshold. A seventh example of the method optionally includes any one or more or each of the first through sixth examples, and further includes wherein the engine combusting air and fuel with the driver demand between the engine pull up threshold and the engine pull down threshold is in response to a vehicle deceleration request where the driver demand drops below the engine pull up threshold but remains above the engine pull down threshold. An eighth example of the method optionally includes any one or more or each of the first through ninth examples, and further includes wherein the engine combusting air and fuel with the driver demand between the engine pull up threshold and the engine pull down threshold is in response to an increasing driver demand where the engine is commanded to combust air and fuel upon the increasing driver demand becoming greater than an inhibit engine pull down threshold that is greater than the engine pull down threshold but lower than the engine pull up threshold.

Another example of a method comprises in response to a power or torque demand increasing above an inhibit pull down threshold while an engine is rotating unfueled, providing fueling and spark to the engine and monitoring a time duration that the power or torque demand remains in a hysteresis region between a maximum modified engine pull down threshold and an engine pull down threshold, where the maximum modified engine pull down threshold is less than an engine pull up threshold but greater than the engine pull down threshold; and responsive to the power or torque demand remaining in the hysteresis region for greater than a predetermined threshold duration, obtaining an adjusted engine pull down threshold and deactivating the engine upon the adjusted engine pull down threshold reaching the power or torque demand while the power or torque demand remains below the engine pull up threshold. In a first example of the method, the method further includes wherein the inhibit pull down threshold is greater than the engine pull down threshold but lower than the engine pull up threshold and the maximum modified engine pull down threshold. A second example of the method optionally includes the first example, and further includes wherein under conditions where fueling and spark is provided to the engine upon the power or torque demand increasing above the inhibit pull down threshold, preventing the engine from being shut down unless the power or torque demand drops below the engine pull down threshold prior to the predetermined threshold duration elapsing. A third example of the method optionally includes any one or more or each of the first and second examples, and further includes wherein obtaining the adjusted engine pull down threshold further comprises raising the engine pull down threshold at a predetermined rate. A fourth example of the method optionally includes any one or more or each of the first through third examples, and further includes wherein the engine is rotating unfueled as a result of a state of charge of an onboard battery being greater than a threshold state of charge; and wherein the engine is commanded to rotate unfueled in response to the power or torque demand being lower than a charge power limit engine pull up threshold under conditions where the state of charge of the onboard battery is greater than the threshold state of charge, and where the charge power limit engine pull up threshold is lower than the engine pull down threshold and the maximum modified engine pull down threshold. A fifth example of the method optionally includes any one or more or each of the first through fourth examples, and further comprises resetting the adjusted engine pull down threshold back to the engine pull down threshold in response to the engine being deactivated upon the adjusted engine pull down threshold reaching the power or torque demand while the power or torque demand remains below the engine pull up threshold, or in response to the power or torque demand increasing above the engine pull up threshold prior to the adjusted engine pull down threshold reaching the power or torque demand. A sixth example of the method optionally includes any one or more or each of the first through fifth examples, and further comprises meeting the power or torque demand via a motor/generator in response to the engine being deactivated upon the adjusted engine pull down threshold reaching the power or torque demand under conditions where the power or torque demand remains below the engine pull up threshold.

An example of a system for a hybrid vehicle may comprise an engine; a motor/generator that receives power from an onboard battery; and a controller with computer readable instructions stored on non-transitory memory that when executed during an engine-off condition, cause the controller to: while the engine is off and in response to a power or torque demand from an operator of the hybrid vehicle or an autonomous controller being lower than a charge power limit engine pull up threshold under conditions where a state of charge of the onboard battery is greater than a threshold state of charge, commanding the engine to rotate unfueled; and in response to the power or torque demand increasing above an inhibit engine pull down threshold while the engine is rotating unfueled, commanding fueling and spark to the engine, monitoring a time duration that the power or torque demand remains in a hysteresis region between an engine pull up threshold and an engine pull down threshold, and if the time duration exceeds a predetermined threshold duration, increasing the engine pull down threshold at a predetermined rate to obtain an adjusted engine pull down threshold and deactivating the engine upon the adjusted engine pull down threshold reaching the power or torque demand while the power or torque demand remains below the engine pull up threshold. In a first example of the system, the system may further include wherein the controller stores further instructions to maintain fueling and spark provided to the engine and reset a timer that monitors the time duration in response to the power or torque demand increasing above the engine pull up threshold prior to the time duration exceeding the predetermined threshold duration or in response to the power or torque demand decreasing below the engine pull down threshold prior to the time duration exceeding the predetermined threshold duration. A second example of the system optionally includes the first example, and further includes wherein the controller stores further instructions to reset the adjusted engine pull down threshold back to the engine pull down threshold in response to the engine being deactivated as a result of the adjusted engine pull down threshold reaching the power or torque demand, or resetting the adjusted engine pull down threshold back to the engine pull down threshold in response to the power or torque demand rising above the engine pull up threshold prior to the adjusted engine pull down reaching the power or torque demand. A third example of the system optionally includes any one or more or each of the first and second examples, and further includes wherein the controller stores further instructions to command the motor/generator to meet the power or torque demand in response to the adjusted engine pull down threshold reaching the power or torque demand under conditions where the power or torque demand remains below the engine pull up threshold.

Discussion herein pertained to an EPU threshold, an EPD threshold, and a modified or adjusted EPD threshold. Accordingly, the EPU threshold may be referred to as a first threshold, the EPD threshold may be referred to as a second threshold, and the modified or adjusted EPD threshold may be referred to as a third threshold. Discussion herein further pertained to an IPD threshold, a maximum modified EPD threshold, a charge limit EPU threshold, and a charge power limit EPD threshold. Accordingly, the IPD threshold may be referred to as a fourth threshold, the maximum modified EPD threshold may be referred to as a fifth threshold, the charge limit EPU threshold may be referred to as a sixth threshold, and the charge limit EPD threshold may be referred to as a seventh threshold.

Accordingly, in another representation, a method may comprise with an engine combusting air and fuel and a requested power between the first threshold and the second threshold, raising the second threshold to obtain a third threshold, and discontinuing engine operating in response to the third threshold reaching the requested power while the requested power remains below the first threshold.

In still another representation, a method may comprise, in response to a power or torque demand increasing above a fourth threshold while an engine is rotating unfueled, providing fueling and spark to the engine and monitoring a time duration that the power or torque demand remains in a hysteresis region between a first threshold and a second threshold. In such a method, in response to the power or torque demand remaining in the hysteresis region for greater than a predetermined threshold duration, the method may include obtaining a third threshold by adjusting the second threshold and deactivating the engine upon the third threshold equaling the power or torque demand while the power or torque demand remains below the first threshold.

For such a method, the third threshold may be greater than the second threshold, but lower than the first threshold.

For such a method, the engine may be rotating unfueled as a result of a state of charge of an onboard battery being greater than a threshold state of charge, and where the engine is commanded to rotate unfueled in response to the power or torque demand being lower than a sixth threshold under conditions where the state of charge of the onboard battery is greater than the threshold state of charge, and where the sixth threshold is lower than the second threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   with an engine combusting air and fuel and a driver demand between an engine pull up threshold and an engine pull down threshold, raising the engine pull down threshold to obtain an adjusted engine pull down threshold; and
   discontinuing engine operation in response to the adjusted engine pull down threshold reaching the driver demand while the driver demand remains below the engine pull up threshold.

2. The method of claim 1, wherein raising the engine pull down threshold to obtain the adjusted engine pull down threshold further comprises raising the engine pull down threshold at a predetermined rate, where the predetermined rate is adjustable as a function of the driver demand.

3. The method of claim 1, further comprising raising the engine pull down threshold in response to the driver demand being between the engine pull up threshold and the engine pull down threshold for greater than a predetermined duration; and
   under conditions where the driver demand does not remain engine pull up between the threshold and the engine pull down threshold for greater than the predetermined duration but instead drops below the engine pull down threshold, discontinuing engine operation.

4. The method of claim 1, further comprising, resetting the adjusted engine pull down threshold to the engine pull down threshold in response to the adjusted pull down threshold reaching the driver demand while the driver demand remains below the engine pull up threshold.

5. The method of claim 1, further comprising, resetting the adjusted pull down threshold to the engine pull down threshold in response to the driver demand becoming greater than the engine pull up threshold prior to the adjusted pull down threshold reaching the driver demand.

6. The method of claim 1, further comprising commanding a motor/generator to meet the driver demand while the driver demand remains between the engine pull up threshold and the engine pull down threshold subsequent to engine operation being discontinued due to the adjusted engine pull down threshold reaching the driver demand.

7. The method of claim 1, wherein raising the engine pull down threshold further comprises stopping raising the engine pull down threshold when a maximum adjusted engine pull down threshold is attained without the adjusted engine pull down threshold reaching the driver demand while the driver demand remains below the engine pull up threshold; and
   wherein the maximum adjusted engine pull down threshold is lower than the engine pull up threshold.

8. The method of claim 1, wherein the engine combusting air and fuel with the driver demand between the engine pull up threshold and the engine pull down threshold is in response to a vehicle deceleration request where the driver demand drops below the engine pull up threshold but remains above the engine pull down threshold.

9. The method of claim 1, wherein the engine combusting air and fuel with the driver demand between the engine pull up threshold and the engine pull down threshold is in response to an increasing driver demand where the engine is commanded to combust air and fuel upon the increasing driver demand becoming greater than an inhibit engine pull down threshold that is greater than the engine pull down threshold but lower than the engine pull up threshold.

10. A method comprising:
    in response to a power or torque demand increasing above an inhibit pull down threshold while an engine is rotating unfueled, providing fueling and spark to the engine and monitoring a time duration that the power or torque demand remains in a hysteresis region between a maximum modified engine pull down threshold and an engine pull down threshold, where the maximum modified engine pull down threshold is less than an engine pull up threshold but greater than the engine pull down threshold; and
    responsive to the power or torque demand remaining in the hysteresis region for greater than a predetermined threshold duration, obtaining an adjusted engine pull down threshold and deactivating the engine upon the adjusted engine pull down threshold reaching the power or torque demand while the power or torque demand remains below the engine pull up threshold.

11. The method of claim 10, wherein the inhibit pull down threshold is greater than the engine pull down threshold but lower than the engine pull up threshold and the maximum modified engine pull down threshold.

12. The method of claim 10, wherein under conditions where fueling and spark is provided to the engine upon the power or torque demand increasing above the inhibit pull down threshold, preventing the engine from being shut down unless the power or torque demand drops below the engine pull down threshold prior to the predetermined threshold duration elapsing.

13. The method of claim 10, wherein obtaining the adjusted engine pull down threshold further comprises:
    raising the engine pull down threshold at a predetermined rate.

14. The method of claim 10, wherein the engine is rotating unfueled as a result of a state of charge of an onboard battery being greater than a threshold state of charge; and
    wherein the engine is commanded to rotate unfueled in response to the power or torque demand being lower than a charge power limit engine pull up threshold under conditions where the state of charge of the onboard battery is greater than the threshold state of charge, and where the charge power limit engine pull up threshold is lower than the engine pull down threshold and the maximum modified engine pull down threshold.

15. The method of claim 10, further comprising resetting the adjusted engine pull down threshold back to the engine pull down threshold in response to the engine being deactivated upon the adjusted engine pull down threshold reaching the power or torque demand while the power or torque demand remains below the engine pull up threshold, or in response to the power or torque demand increasing above the engine pull up threshold prior to the adjusted engine pull down threshold reaching the power or torque demand.

16. The method of claim 10, further comprising meeting the power or torque demand via a motor/generator in response to the engine being deactivated upon the adjusted engine pull down threshold reaching the power or torque demand under conditions where the power or torque demand remains below the engine pull up threshold.

17. A system for a hybrid vehicle, comprising:
    an engine;
    a motor/generator that receives power from an onboard battery; and a controller with computer readable instructions stored on non-transitory memory that when executed during an engine-off condition, cause the controller to:

while the engine is off and in response to a power or torque demand from an operator of the hybrid vehicle or an autonomous controller being lower than a charge power limit engine pull up threshold under conditions where a state of charge of the onboard battery is greater than a threshold state of charge, commanding the engine to rotate unfueled; and in response to the power or torque demand increasing above an inhibit engine pull down threshold while the engine is rotating unfueled, commanding fueling and spark to the engine, monitoring a time duration that the power or torque demand remains in a hysteresis region between an engine pull up threshold and an engine pull down threshold, and if the time duration exceeds a predetermined threshold duration, increasing the engine pull down threshold at a predetermined rate to obtain an adjusted engine pull down threshold and deactivating the engine upon the adjusted engine pull down threshold reaching the power or torque demand while the power or torque demand remains below the engine pull up threshold.

18. The system of claim 17, wherein the controller stores further instructions to maintain fueling and spark provided to the engine and reset a timer that monitors the time duration in response to the power or torque demand increasing above the engine pull up threshold prior to the time duration exceeding the predetermined threshold duration or in response to the power or torque demand decreasing below the engine pull down threshold prior to the time duration exceeding the predetermined threshold duration.

19. The system of claim 17, wherein the controller stores further instructions to reset the adjusted engine pull down threshold back to the engine pull down threshold in response to the engine being deactivated as a result of the adjusted engine pull down threshold reaching the power or torque demand, or resetting the adjusted engine pull down threshold back to the engine pull down threshold in response to the power or torque demand rising above the engine pull up threshold prior to the adjusted engine pull down reaching the power or torque demand.

20. The system of claim 17, wherein the controller stores further instructions to command the motor/generator to meet the power or torque demand in response to the adjusted engine pull down threshold reaching the power or torque demand under conditions where the power or torque demand remains below the engine pull up threshold.

\* \* \* \* \*